US009211535B2

United States Patent
Morita et al.

(10) Patent No.: US 9,211,535 B2
(45) Date of Patent: Dec. 15, 2015

(54) PROCESS FOR PRODUCING DISPERSION OF PARTICLES OF RUTILE TITANIUM OXIDE

(75) Inventors: Takanori Morita, Sakai (JP); Kenichi Nakagawa, Sakai (JP); Atsushi Nomura, Sakai (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 444 days.

(21) Appl. No.: 13/816,545

(22) PCT Filed: Aug. 15, 2011

(86) PCT No.: PCT/JP2011/068813
§ 371 (c)(1),
(2), (4) Date: Feb. 12, 2013

(87) PCT Pub. No.: WO2012/023621
PCT Pub. Date: Feb. 23, 2012

(65) Prior Publication Data
US 2013/0143729 A1 Jun. 6, 2013

(30) Foreign Application Priority Data
Aug. 17, 2010 (JP) ................................. 2010-182147

(51) Int. Cl.
*B01J 23/00* (2006.01)
*C01G 23/047* (2006.01)
(Continued)

(52) U.S. Cl.
CPC ............... *B01J 31/38* (2013.01); *C01G 23/047* (2013.01); *C01G 23/0536* (2013.01);
(Continued)

(58) Field of Classification Search
CPC .. B01J 21/063; C01G 23/047; C01G 23/0536
USPC ............... 502/350; 423/612; 516/90
See application file for complete search history.

(56) References Cited

U.S. PATENT DOCUMENTS 3,749,764 A * 7/1973 Basque et al. ................. 423/610
3,923,968 A * 12/1975 Basque et al. ................. 423/611
(Continued)

FOREIGN PATENT DOCUMENTS

JP 2006-335619 * 12/2006 ........... C01G 23/053
JP 2010-132494 * 6/2010 ............. C01G 25/02
(Continued)

OTHER PUBLICATIONS

International Search Report issued Sep. 27, 2011 in International (PCT) Application No. PCT/JP2011/068813.

*Primary Examiner* — Patricia L Hailey
(74) *Attorney, Agent, or Firm* — Wenderoth, Lind & Ponack, L.L.P.

(57) ABSTRACT

The invention provides a process for producing an aqueous dispersion of particles of rutile titanium oxide, which comprises:
a first step in which after a chloride ion concentration of an aqueous solution of titanium tetrachloride is adjusted to 0.5 mole/L or more and less than 4.4 mole/L, the aqueous solution of titanium tetrachloride is heated at a temperature in a range of from 25° C. to 75° C. to hydrolyze the titanium tetrachloride, thereby obtaining a slurry containing the thus precipitated particles of rutile titanium oxide;
a second step in which the slurry obtained in the first step is filtered and washed with water to remove water-soluble salts dissolved therein from the slurry;
a third step in which the slurry obtained in the second step is subjected to a hydrothermal reaction in the presence of an organic acid;
a fourth step in which the slurry obtained in the third step is filtered and washed with water to remove water-soluble salts dissolved therein from the slurry;
a fifth step in which an acid is added to the slurry obtained in the fourth step to deflocculate the slurry, and the resulting slurry is subjected to wet dispersion treatment, thereby obtaining a dispersion; and
a sixth step in which excess acid and water-soluble salts are removed from the dispersion obtained in the fifth step.

9 Claims, 3 Drawing Sheets

(51) Int. Cl.
*C09K 3/00* (2006.01)
*B01J 31/38* (2006.01)
*C08L 101/00* (2006.01)
*G02B 1/04* (2006.01)
*C09D 17/00* (2006.01)
*C01G 23/053* (2006.01)
*C09C 1/36* (2006.01)

(52) U.S. Cl.
CPC ............ *C08L 101/00* (2013.01); *C09C 1/3607* (2013.01); *C09D 17/008* (2013.01); *G02B 1/04* (2013.01); *C01P 2002/52* (2013.01); *C01P 2002/54* (2013.01); *C01P 2002/72* (2013.01); *C01P 2004/51* (2013.01); *C01P 2004/62* (2013.01); *C01P 2006/12* (2013.01)

(56) References Cited

U.S. PATENT DOCUMENTS

| | | | | |
|---|---|---|---|---|
| 5,622,628 | A * | 4/1997 | Trendell et al. | 210/651 |
| 6,627,336 | B1 * | 9/2003 | Ohmori et al. | 428/702 |
| 2002/0005145 | A1 * | 1/2002 | Sherman | 106/436 |
| 2011/0192322 | A1 * | 8/2011 | Lamminmaki et al. | 106/447 |
| 2011/0301270 | A1 * | 12/2011 | Nomura et al. | 524/379 |

FOREIGN PATENT DOCUMENTS

| | | | | |
|---|---|---|---|---|
| JP | 2010-150066 | * | 7/2010 | C01G 25/02 |
| KR | 10-2013-7006045 | * | 12/2013 | C01G 23/053 |

\* cited by examiner

PROCESS FOR PRODUCING DISPERSION OF PARTICLES OF RUTILE TITANIUM OXIDE

This application is a U.S. national stage of International Application No. PCT/JP2011/068813 filed Aug. 15, 2011.

TECHNICAL FIELD

The present invention relates to a process for producing a dispersion of particles of rutile titanium oxide, and further to use of the dispersion of particles of rutile titanium oxide, particularly use for a resin composition.

BACKGROUND-ART

Many processes for producing a dispersion of particles of rutile titanium oxide are already conventionally known. The most general process is the one in which a titanium salt is hydrolyzed to prepare a slurry of hydrous titanium oxide, and the slurry is deflocculated with an acid or an alkali to obtain a dispersion. However, the particles of titanium oxide in the dispersion of rutile titanium oxide obtained in this conventionally known process have a D90 of 40 nm or more, and therefore they cannot be used in such an application of a resin molding or a coating agent for hard coating where the particles are required to have a high transparency.

Recently, some processes for producing a dispersion of fine particles of rutile titanium oxide are proposed. For example, a process is proposed in which titanium tetrachloride and hydrochloric acid are mixed in water having a temperature of 65 to 90° C., and the mixture is heated to a temperature of 65° C. to a boiling point of the resulting mixture to hydrolyze the titanium tetrachloride, thereby a dispersion of particles of rutile titanium oxide is obtained (Patent literature 1).

According to this process, a dispersion of fine particles of rutile titanium oxide having a BET specific surface area within a range of 50 to 300 $m^2/g$ can be obtained, but the process has a defect in which the particles of titanium oxide obtained have a low crystallinity.

In general, the higher the crystallinity of particles of rutile titanium oxide, the more effective the exhibition of various physical properties of the rutile titanium oxide such as a UV shielding property, photocatalytic activity, and refractive index, and hence it is preferred that the particles of rutile titanium oxide have a higher crystallinity. The increase of the crystallinity of particles of titanium oxide can be confirmed by increase of peak intensity in a powder X-ray diffraction analysis without being accompanied by particle growth. Furthermore, it is believed that the particles of rutile titanium oxide obtained by thermal hydrolysis of titanium tetrachloride are not increased in crystallinity because amorphous titanium compounds are intermixed therein, and that there are volatile components such as water which are contained in or adhere to the particles. For comparison of the amount of the amorphous titanium compounds, variations in weight loss on heating may be compared. It can be said that the smaller the weight loss on heating, the higher the crystallinity.

It is traditionally known that the crystallinity of rutile titanium oxide can be increased by calcining it, but when the oxide is calcined, the particles grow at the same time, and therefore the crystallinity cannot be increased while the particles remain fine. To be highly crystalline is traded off against to be fine in particle size.

As another process for producing a dispersion of fine particles of rutile titanium oxide, for example, a process is proposed in which fine particles of rutile titanium oxide which have been previously produced are dispersed in water (Patent literature 2). According to this process, however, the particles of titanium oxide dispersed in water have an average particle size at least of no less than 70 nm.

PRIOR ART LITERATURES

Patent Literatures

Patent literature 1: JP 2006-335619A
Patent literature 2: JP 07-232925A

SUMMARY OF THE INVENTION

Problem to be Solved by the Invention

The present invention has been made in order to solve the above-mentioned various problems involved in conventional processes for producing dispersions of particles of rutile titanium oxide. Therefore, it is an object of the invention to provide a process for producing a dispersion of particles of rutile titanium oxide which are very fine, and are yet highly crystalline.

More particularly, it is an object of the invention to provide a process for producing a dispersion of rutile titanium oxide wherein the particles of rutile titanium oxide have a D50 of 15 nm or less, preferably in a range of 1 to 15 nm, and a D90 of 40 nm or less, preferably 25 nm or less, in particle size distribution as determined by a dynamic light scattering method; a specific surface area of 120 $m^2/g$ or more as determined by a BET method; and a rate of weight loss of 5% or less as obtained by heating the particles of rutile titanium oxide from 105° C. to 900° C.

It is a further object of the invention to provide use of such a dispersion of particles of rutile titanium oxide, in particular, use in resin compositions such as resin moldings and coatings.

Solution to Problem

The invention provides a process for producing an aqueous dispersion of particles of rutile titanium oxide, which comprises:

a first step in which after a chloride ion concentration of an aqueous solution of titanium tetrachloride is adjusted to 0.5 mole/L or more, and less than 4.4 mole/L, the aqueous solution of titanium tetrachloride is heated at a temperature in a range of from 25° C. to 75° C. to hydrolyze the titanium tetrachloride, thereby obtaining a slurry containing the thus precipitated particles of rutile titanium oxide;

a second step in which the slurry obtained in the first step is filtered and washed with water to remove water-soluble salts dissolved therein from the slurry;

a third step in which the slurry obtained in the second step is subjected to a hydrothermal reaction in the presence of an organic acid;

a fourth step in which the slurry obtained in the third step is filtered and washed with water to remove water-soluble salts dissolved therein from the slurry;

a fifth step in which an acid is added to the slurry obtained in the fourth step to deflocculate the slurry, and the resulting slurry is subjected to wet dispersion treatment, thereby obtaining a dispersion; and a sixth step in which excess acid and water-soluble salts are removed from the dispersion obtained in the fifth step.

The invention further provides a process for producing a dispersion of particles of rutile titanium oxide, which comprises displacing water that is the dispersion medium of the aqueous dispersion of particles of rutile titanium oxide obtained in the sixth step mentioned above by an organic solvent in accordance with a conventionally known solvent displacement method.

The invention still further provides a resin composition which comprises a resin and the dispersion of particles of rutile titanium oxide obtained by a process described above mixed with the resin.

Effects of the Invention

In the dispersion of particles of rutile titanium oxide obtained according to the process of the invention, the particles of rutile titanium oxide have a higher crystallinity and a higher dispersion stability while the particle size (D50) is as small as 15 nm or less as calculated from a BET specific surface area, as compared to the conventionally known dispersions obtained by thermal hydrolysis of titanium tetrachloride. Accordingly, for example, when the dispersion obtained according to the invention is mixed with and dispersed in a resin to prepare a resin composition, easy and uniform dispersion of titanium oxide can be realized therein compared to a case in which powder of titanium oxide is mixed with and dispersed in a resin. Thus, the moldings of the thus obtained resin composition can effectively exhibit the properties of the particles of rutile titanium oxide such as a UV shielding property, high refractive index, and photocatalytic activity.

DESCRIPTION OF EMBODIMENTS

Figure 1:
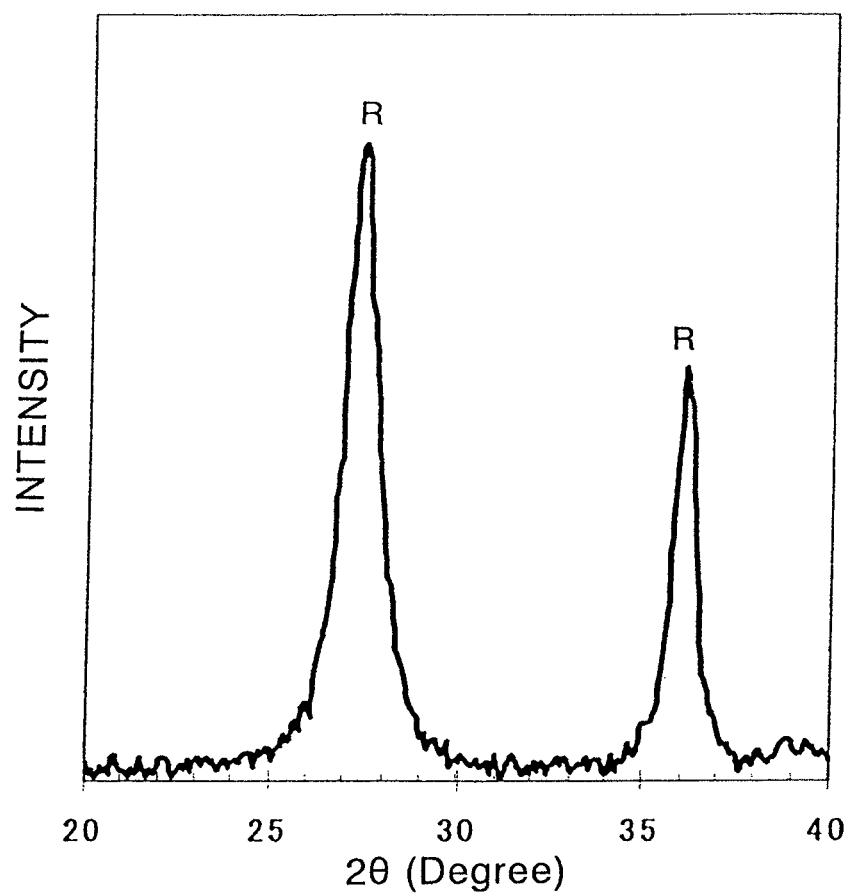
FIG. 1 shows a powder X-ray diffraction pattern of particles of rutile titanium oxide obtained from a dispersion obtained by the process according to the invention.

The process for producing an aqueous dispersion of particles of rutile titanium oxide according to the invention comprises:

a first step in which after a chloride ion concentration of an aqueous solution of titanium tetrachloride is adjusted to 0.5 mole/L or more, and less than 4.4 mole/L, the aqueous solution of titanium tetrachloride is heated at a temperature in a range of from 25° C. to 75° C. to hydrolyze the titanium tetrachloride, thereby obtaining a slurry containing the thus precipitated particles of rutile titanium oxide;

a second step in which the slurry obtained in the first step is filtered and washed with water to remove water-soluble salts dissolved therein from the slurry;

a third step in which the slurry obtained in the second step is subjected to a hydrothermal reaction in the presence of an organic acid;

a fourth step in which the slurry obtained in the third step is filtered and washed with water to remove water-soluble salts dissolved therein from the slurry;

a fifth step in which an acid is added to the slurry obtained in the fourth step to deflocculate the slurry, and the resulting slurry is subjected to wet dispersion treatment, thereby obtaining a dispersion; and a sixth step in which excess acid and water-soluble salts are removed from the dispersion obtained in the fifth step.

In the aqueous dispersion of particles of rutile titanium oxide thus obtained according to the process of the invention, the dispersion has a particle size distribution as determined by a dynamic light scattering method in which the particles of rutile titanium oxide have a D50 of 15 nm or less, and a D90 of 40 nm or less. The particles of rutile titanium oxide have a specific surface area of 120 $m^2/g$ or more as determined by a BET method, and have a rate of weight loss of 5% or less as obtained by heating the particles of rutile titanium oxide from 105° C. to 900° C.

Further according to the invention, a dispersion of particles of rutile titanium oxide whose dispersion medium is an organic solvent can be obtained by displacing the water, which is the dispersion medium of the aqueous dispersion of particles of rutile titanium oxide obtained by the method as described above, by an organic solvent.

The process for producing an aqueous dispersion of particles of rutile titanium oxide according to the invention is described below.

The first step is a step in which titanium tetrachloride is thermally hydrolyzed in water so that particles of rutile titanium oxide are precipitated, thereby to obtain a slurry containing such particles of rutile titanium oxide. In more detail, in the first step, water is added to the aqueous solution of titanium tetrachloride so that it has a content of titanium oxide ($TiO_2$, hereinafter the same) in a range of 10 to 100 g/L, and a chloride ion concentration of 0.5 mole/L or more, and less than 4.4 mole/L. Subsequently, the aqueous solution is heated at a temperature in a range of 25-75° C. for 1-10 hours, although not limited, so that the titanium tetrachloride is hydrolyzed and particles of rutile titanium oxide are precipitated.

Upon such hydrolysis of titanium tetrachloride, when the chloride ion concentration of the aqueous solution of titanium tetrachloride is 4.4 mole/L or more, it is difficult to hydrolyze the aqueous solution of titanium tetrachloride at a practical rate at a hydrolysis temperature of 75° C. or less. On the other hand, when the chloride ion concentration of the aqueous solution of titanium tetrachloride is less than 0.5 mole/L, the concentration is too small to hydrolyze the aqueous solution of titanium tetrachloride in an industrial scale, that is, such a hydrolysis process is neither efficient nor practical.

When the hydrolysis temperature of aqueous solution of titanium tetrachloride is more than 75° C., the hydrolysates of titanium tetrachloride formed often get mixed with anatase titanium oxide or brookite titanium oxide if the chloride ion concentration of the aqueous solution of titanium tetrachloride is adjusted at 0.5 mole/L or more, and less than 4.4 mole/L.

The hydrolysis rate of titanium tetrachloride depends on hydrolysis temperature, and the higher the temperature, the higher the hydrolysis rate. Therefore, higher temperature is industrially advantageous. When the hydrolysis temperature is less than 25° C., it is difficult to carry out the hydrolysis of titanium tetrachloride at a practical rate.

According to the invention, it is particularly preferred that in the first step, water is added to an aqueous solution of titanium tetrachloride to adjust the chlorine concentration of the solution at 1.0 mole/L or more, and 4.3 mole/L or less, and then the solution is heated at a temperature of 30-75° C. for 1-5 hours, although not limited, thereby to hydrolyze titanium tetrachloride and precipitate particles of rutile titanium oxide.

The second step is a step in which the slurry obtained in the first step is filtered and washed with water to remove water-soluble salts dissolved therein from the slurry. In the second step, although the means and procedures for filtering and washing the slurry with water are not particularly limited, when a suitable alkali is added to the slurry before it is filtered to adjust the pH of the slurry to an isoelectric point of titanium oxide, the slurry can be efficiently filtered and washed with water.

The third step is a step in which the slurry obtained in the second step is subjected to a hydrothermal reaction in the presence of an organic acid, which is a particle growth inhibiting agent, to increase the crystallinity of particles of the rutile titanium oxide, while the particle growth is inhibited. As the organic acid, carboxylic acids and hydroxycarboxylic acids are used, and their salts may also be used. Concrete examples of the organic acid may include monocarboxylic acids such as formic acid, acetic acid, and propionic acid, and their salts; polybasic acids such as oxalic acid, malonic acid, succinic acid, fumaric acid, and maleic acid, and their salts; hydroxycarboxylic acids such as lactic acid, malic acid, tartaric acid, citric acid, and gluconic acid, and their salts. As the salts of the carboxylic acid and the hydroxycarboxylic acid, for example, alkali metal salts such as sodium salts and potassium salts are preferably used.

According to the invention, when the organic acid is used in an amount of 75 parts by mole or more per 100 parts by mole of titanium oxide, the crystallinity of particles of rutile titanium oxide obtained by the hydrothermal reaction can be effectively increased while the growth of particles of rutile titanium oxide obtained is inhibited. When the amount of the organic acid is less than 75 parts by mole per 100 parts by mole of titanium oxide, the effect for inhibiting the growth of particles of rutile titanium oxide cannot be obtained in the hydrothermal reaction. A preferred amount of the organic acid is 85 parts by mole or more per 100 parts by mole of titanium oxide. On the other hand, the upper limit of the amount of the organic acid used relative to titanium oxide is not particularly limited, but even if a too much amount of the organic acid is used, the effect for increasing the crystallinity of particles of rutile titanium oxide is not improved any more. Therefore, an amount of 200 parts by mole or less of the organic acid per 100 parts by mole of titanium oxide is usually enough.

Further according to the invention, the temperature at which the hydrothermal reaction is performed is in a range of 120 to 180° C. When the temperature is lower than 120° C., the crystallinity of particles of rutile titanium oxide obtained cannot be increased. On the other hand, when it is higher than 180° C., the particles grow remarkably. That is, it is difficult to increase the crystallinity while the particle growth is inhibited. In particular, according to the invention, it is advantageous to perform the hydrothermal reaction at a temperature in a range of 140 to 160° C. because not only the crystallinity of particles of rutile titanium oxide obtained is increased while the growth of particles of rutile titanium oxide is inhibited, but also the effects described above can be obtained in a short time.

The fourth step is a step in which a suitable alkali such as an aqueous solution of sodium hydroxide is added to the slurry obtained by the hydrothermal reaction to neutralize the organic acid in the slurry, and then the slurry is filtered and washed with water to remove water-soluble salts dissolved therein from the slurry. In the fourth step, the means and procedures for filtering and washing the slurry with water are not also particularly limited, but as mentioned above, the slurry can be efficiently filtered and washed with water by adding a suitable alkali to the slurry before it is filtered to adjust the pH of the slurry to an isoelectric point of titanium oxide. In the fourth step, it is further preferable that the slurry is filtered and washed with water so that the slurry has an electric conductivity is 100 μS/cm or less when the slurry is repulped so that it has a concentration of the particles of rutile titanium oxide of 100 g/L.

The fifth step is a step in which an acid is added to the slurry obtained in the fourth step to deflocculate the particles of rutile titanium oxide, and then the resulting slurry is subjected to wet dispersion treatment to obtain a dispersion.

The acid used for the deflocculation may be an inorganic acid or an organic acid. As the inorganic acid, for example, nitric acid and hydrochloric acid are preferable. As the organic acid, for example, monocarboxylic acids such as formic acid, acetic acid, and propionic acid; polybasic acids such as oxalic acid, malonic acid, succinic acid, fumaric acid, and maleic acid; and hydroxycarboxylic acids such as lactic acid, malic acid, tartaric acid, citric acid, and gluconic acid are preferable. The acid is used usually in an amount of 15 to 100 parts by mole, preferably 20 to 70 parts by mole, per 100 parts by mole of titanium oxide.

The wet dispersion treatment in the fifth step may be performed in a commonly known manner. For example, a bead mill is preferably used. Beads having a Mohs hardness higher than titania are preferable, and for example, zirconia beads are preferably used. In a preferred embodiment, the slurry and zirconia beads having a diameter of 15 to 300 μm are placed in a bead mill, and the dispersion treatment is performed, thereby providing an aqueous dispersion of particles of rutile titanium oxide.

The sixth step is a step in which water-soluble salts dissolved in the aqueous dispersion obtained in the fifth step is removed therefrom in order to make the aqueous dispersion stable. The means and procedures for removing the water-soluble salts dissolved in the aqueous dispersion are not particularly limited. For example, dialysis or ultrafiltration or the like may be made use of. The dispersion obtained in the fifth step contains the acid or deflocculant described above, and thus the electric conductivity thereof is usually higher than 10 mS/cm. In the sixth step, however, the electric conductivity of the dispersion is adjusted to a range of 0.1 to 5 mS/cm, preferably 1 to 3 mS/cm, thereby a dispersion having a high stability of particles of the rutile titanium oxide can be obtained.

As described above, according to the invention, titanium tetrachloride is thermally hydrolyzed in an aqueous solution so that particles of rutile titanium oxide are precipitated; the particles are subjected to hydrothermal treatment in the presence of an organic acid so that the crystallinity of the particles is increased while inhibiting the growth of the particle; subsequently an acid is added to the thus obtained slurry of particles of rutile titanium oxide to deflocculate the slurry, and then the resulting slurry is subjected to wet dispersion treatment to obtain a dispersion of particles of rutile titanium oxide; and then excess acid and water-soluble salts dissolved in the dispersion are removed, thereby an aqueous dispersion in which particles of rutile titanium oxide are stably dispersed in water without causing aggregation can be obtained.

The thus obtained dispersion of particles of rutile titanium oxide according to the invention has a D50 of 15 nm or less, preferably in a range of 1 to 15 nm, and a D90 of 40 nm or less in particle size distribution as determined by a dynamic light scattering method. The particles of rutile titanium oxide have a specific surface area of 120 m$^2$/g or more as determined by a BET method. Further, the particles of rutile titanium oxide obtained by drying the dispersion have a rate of weight loss of 5% or less when they are heated at a temperature from 105° C. to 900° C., and thus have a high crystallinity. Thus, according to the process of the invention, an aqueous dispersion in which fine particles of rutile titanium oxide make a dispersed phase and which has excellent dispersion stability.

Consequently, for example, when the dispersion of particles of rutile titanium oxide according to the invention is mixed with and dispersed in a resin to prepare a resin composition, easy and uniform dispersion of titanium oxide can be realized compared to a case in which powder of titanium oxide is mixed with and dispersed in a resin. The moldings of the thus obtained resin composition can effectively exhibit the properties of particles of rutile titanium oxide such as a UV shielding property, high refractive index, and photocatalytic activity.

According to the invention, a step precedent to the third step, which is referred to the pre-third step hereafter, may be provided between the above-mentioned second step and the third step. In the pre-third step the slurry obtained in the second step is wet-ground in the presence of an organic acid, thereby an aqueous dispersion of much more fine particles of rutile titanium dioxide can be obtained.

In the above-mentioned wet grinding treatment of slurry of particles of titanium dioxide, the organic acid is used as a viscosity increase suppressant to prevent the increase of viscosity of the slurry while it is wet-ground so that the slurry is easily wet-ground. The organic acid also functions as a particle growth inhibiting agent when the slurry of particles of titanium dioxide are subjected to hydrothermal reaction in the third step described later.

Thus, according to the invention, the organic acid may be used in the pre-third step in such an amount that is enough to function as a viscosity increase suppressant. However, it is preferred that the organic acid is usually used in the pre-third step in an amount of 75 parts by mole or more per 100 parts by mole of titanium oxide in order that it functions effectively as a particle growth inhibiting agent when the slurry of fine particles of titanium dioxide are subjected to hydrothermal reaction in the third step described later.

The organic acid used may be the same carboxylic acids and hydroxycarboxylic acids as used in the third step. These carboxylic acids and hydroxycarboxylic acids may be in the form of salts. The same examples of organic acid may be mentioned.

The wet dispersion treatment in the pre-third step may be performed in a commonly known manner, like the wet dispersion treatment set out before, and for example a bead mill is preferably used. Beads having a Mohs hardness higher than titania are preferable, and for example, zirconia beads are preferably used. In a preferred embodiment, the slurry and zirconia beads having a diameter of 15 to 300 µm are placed in a bead mill, and the wet dispersion treatment is performed, thereby providing a slurry of particles of rutile titanium oxide.

When the slurry obtained in the second step is wet-ground in the presence of an organic acid in the pre-third step between the second and the third step, the resulting slurry obtained in the pre-third step and containing the organic acid is subjected to a hydrothermal reaction together with the organic acid in the subsequent third step in which the organic acid is made use of as a particle growth inhibiting agent.

Therefore, the amount of the organic acid used in the third step is usually 75 parts by mole or more, preferably 75 to 200 parts by mole, per 100 parts by mole of titanium oxide, as mentioned before. When there is a shortage of the organic acid in the third step, the shortage may be made up for in the third step, as necessary. In this case, the organic acid used may be different from the organic acid used in the pre-third step.

Further according to the invention, as set out before, an acid is added in the fifth step to the slurry obtained in the fourth step to deflocculate particles of rutile titanium oxide, and then the resulting slurry is subjected to wet grinding treatment, followed by wet dispersion treatment, thereby an aqueous dispersion of much more fine particles of rutile titanium oxide is obtained.

In general, the boarder between the wet grinding treatment and the wet dispersion treatment is not necessarily clear, and on the other hand, the wet grinding treatment and the wet dispersion treatment are often performed concurrently. However, particles can be mainly subjected to one of the wet grinding treatment and the wet dispersion treatment, for example, by adjusting the size of beads used, or by adjusting the rotation rate when a recycling bead mill is used.

When an aqueous dispersion of much more fine particles of rutile titanium oxide is to be obtained, for example, by treating a dispersion using a recycling bead mill first by subjecting the slurry to wet grinding treatment and then to wet dispersing treatment, the optimal conditions for the treatment such as the optimal rotation rate or time can be determined by changing the rotation rate or time to examine the particle size distribution and dispersion stability of the slurry thus obtained.

If necessary, when the dispersion medium, that is, water, of the thus obtained aqueous dispersion of particles of rutile titanium oxide can be displaced by an organic solvent using a conventionally known solvent displacement method, a dispersion whose dispersion medium is the organic solvent can be obtained. The organic solvent used is not particularly limited, but water-miscible organic solvents are used preferably. The water-miscible organic solvents are not particularly limited, and examples thereof include aliphatic alcohols such as methanol, ethanol, and 2-propanol; aliphatic carboxylic acid esters such as ethyl acetate and methyl formate; aliphatic ketones such as acetone, methyl ethyl ketone, and methyl isobutyl ketone; polyhydric alcohols such as ethylene glycol and glycerine; and mixtures of two or more of these. Methanol, methyl ethyl ketone, methyl isobutyl ketone, and the mixture thereof are particularly preferable.

The water or the dispersion medium of the aqueous dispersion of particles of rutile titanium oxide can be displaced by an organic solvent by adding the organic solvent to the aqueous dispersion while the aqueous dispersion is distilled to remove the water; by distilling the aqueous dispersion to remove the water from the aqueous dispersion, and then adding an organic solvent to the dispersion to dilute it, and repeating such concentration and dilution; or by subjecting the aqueous dispersion to ultrafiltration to remove the water, and then adding an organic solvent to the dispersion to dilute it, and repeating such concentration and dilution. In this way, the water which is the original dispersion medium can be displaced by an organic solvent to obtain a dispersion of particles of rutile titanium oxide whose dispersion medium is the organic solvent.

It is also possible that the water, the dispersion medium of the aqueous dispersion of particles of rutile titanium oxide, is displaced by a water-miscible organic solvent to obtain a dispersion whose dispersion medium is the water-miscible organic solvent, and then the water-miscible organic solvent is displaced by yet another organic solvent to obtain a dispersion whose dispersion medium is the other organic solvent.

The dispersion of particles of rutile titanium oxide of the invention, preferably the dispersion whose dispersion medium has been changed to an organic solvent by a solvent displacement method, can be preferably used in various resin compositions. That is, preferably the dispersion of particles of rutile titanium oxide whose dispersion medium is an organic solvent is mixed with a resin and the dispersion is uniformly dispersed in the resin, thereby a resin composition containing the particles of rutile titanium oxide can be obtained. The amount of the rutile titanium oxide relative to the resin depends on the use and the desired properties of the resulting resin composition, and it is usually within a range of 5 to 350 parts by weight per 100 parts by weight of the resin.

The above-mentioned resin may be appropriately selected depending on the use and the desired properties of the resulting resin composition, and concrete examples thereof may include polyolefin resins including homopolymers and copolymers of olefins, such as polyethylene, polypropylene, ethylene-propylene copolymers, ethylene-propylene-diene monomer terpolymers, ethylene-butene copolymers, ethylene-acrylic acid ester (such as ethyl acrylate) copolymers, ethylene-vinyl acetate copolymers, and ethylene-methyl methacrylate copolymers; homopolymers of an aromatic vinyl monomer such as styrene and copolymers thereof such as ABS resins; poly(meth)acrylic resins; polyesters such as polyethylene terephthalate, polybutylene terephthalate, and polyarylates; polyamides such as 6-nylone, 6,6-nylone, 12-nylone, 46-nylone, and aromatic polyamides; polyethers such as polyphenylene ether, modified polyphenylene ethers, and polyoxymethylenes; polycarbonates; elastomers such as styrene-conjugated diene copolymers, polybutadiene, polyisoprene, acrylonitrile-butadiene copolymers, and polychloroprene; polyvinyl chloride, and the like. If necessary, thermosetting resins such as phenol resins, epoxy resins, unsaturated polyesters, and polyurethanes, and silicone resins may also be used as the resin. These resins may be used alone or as a mixture of two or more kinds thereof.

The rutile titanium oxide-containing resin composition according to the invention may contain other additives depending on the resin, if necessary, in addition to the rutile titanium oxide described above. Such additives may include, for example, a plasticizer, a lubricant, a filler, an antioxidant, a heat stabilizer, a nucleating agent, a cross-linking agent, a cross-linking auxiliary agent, an antistatic agent, a compatibilizing agent, a light proofing agent, a pigment, a foaming agent, an anti-fungal agent, a coupling agent, and the like.

The resin composition can be obtained by mixing the dispersion of particles of rutile titanium oxide described above with a resin and kneading the mixture making use of an appropriate technique such as a stirring and mixing machine, a single screw extruder, a twin screw extruder, a roll kneader, a kneader, a Banbury mixer, a ball mill, or a bead mill. The thus obtained resin composition according to the invention can be preferably used for various moldings by an appropriate method such as an injection molding, an extrusion molding, a blow molding, a press molding, a vacuum forming, a calendar molding, a transfer molding, a laminate molding, a molding using a die, and a film forming method using a solution, depending on the use or purpose.

EXAMPLES

The invention will be explained in more detail with reference to Examples below, but the invention is not limited to these Examples at all. In the following Examples and Comparative Examples, ion concentrations in aqueous dispersions of particles of titanium oxide obtained in the course of production of aqueous dispersions of particles of titanium oxide were measured in a manner as described below. The properties of aqueous dispersions of particles of rutile titanium oxide obtained and the properties of particles of titanium oxide obtained therefrom were evaluated as described below.

(Titanium Ion Concentration)

The titanium ion concentration was determined in accordance with the method described in JIS K 5116.

(Chloride Ion Concentration)

The chloride ion concentration was determined by using an F-50 series chlorine ion electrode manufactured by HORIBA, Ltd.

(Crystal Structure of Particles)

The crystal structure of particles was determined by using a powder X-ray diffraction apparatus (RINT-TTR 3 manufactured by Rigaku Corporation) (Cu Kα radiation).

(Specific Surface Area of Particles)

The specific surface area of particles was determined in accordance with a BET method (multi-point nitrogen adsorption method) using GEMINI 2360 manufactured by Micro Meritics Instrument Corporation wherein degassing treatment was performed at 230° C. for 40 minutes as pretreatment.

(Weight Loss on Heating)

The weight of an amount of particles was determined at 105° C. and at 900° C. using SSC5200 TG/DTA 320 manufactured by Seiko Instruments Inc., and a difference in weight was calculated.

(Particle Size Distribution of Dispersion)

The particle size distribution was determined in accordance with a dynamic light scattering method using UPA-UT 151 manufactured by Nikkiso Co., Ltd. D50 is a particle size of a particle at which 50% by volume of particles is accumulated from the smallest particle side in a volume based particle size distribution. D90 is a particle size of a particle at which 90% by volume of particles is accumulated from the smallest particle side in a volume based particle size distribution. D100 is a particle size of a particle at which 100% by volume of particles is accumulated from the smallest particle side in a volume based particle size distribution.

(Dispersion Stability of Aqueous Dispersion)

After an aqueous dispersion was allowed to stand at room temperature for one month, it was visually observed. When the aqueous dispersion was found to be gelled or found to have no fluidity, it was judged to be "Bad", while the aqueous dispersion was found to still hold fluidity, it was judged to be "Good".

(Transmittance and Haze Value of Thin Film)

The transmittance and the haze value of a thin film were determined using a Haze meter NDH-2000 manufactured by Nippon Denshoku Industries Co., Ltd.

Example 1

First Step

An aqueous solution of titanium tetrachloride having a chloride ion concentration of 2.3 mole/L and a titanium ion concentration of 50.7 g/L in terms of titanium oxide was placed in a separable flask equipped with a reflux apparatus, and it was heated at a temperature of 70° C. for 3 hours so that the titanium tetrachloride was hydrolyzed, thereby a slurry containing the thus precipitated particles of rutile titanium oxide was obtained.

Second Step

The slurry was filtered through a filter paper made of glass fiber having a collection diameter of 300 nm, and unreacted titanium tetrachloride and dissolved components were removed. The thus obtained particles of rutile titanium oxide were repulped in water to prepare a slurry, and an aqueous solution of sodium hydroxide was added to the slurry until it had a pH of 7.0. The resulting slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 50 g/L in terms of titanium oxide, the resulting slurry had an electric conductivity of 100 μS/cm or less.

Third Step

The particles of rutile titanium oxide obtained in the second step were repulped in water so that the resulting slurry had a content of 50 g/L of rutile titanium oxide in terms of titanium oxide. Acetic acid was added to the slurry in an amount of 150 parts by mole per 100 parts by mole of the titanium oxide in the slurry. The resulting mixture was subjected to a hydrothermal reaction at 150° C. for 3 hours to increase the crystallinity of particles of rutile titanium oxide.

Fourth Step

An aqueous solution of sodium hydroxide was added to the slurry obtained by the hydrothermal reaction described above until the slurry had a pH of 5.0. The slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 100 g/L in terms of titanium oxide, the resulting slurry had an electric conductivity of 100 μS/cm or less.

Fifth Step

The particles of rutile titanium oxide obtained in the fourth step were repulped in water so that the resulting slurry had a content of 100 g/L of rutile titanium oxide in terms of titanium oxide. Nitric acid was then added to the slurry in an amount of 30 parts by mole per 100 parts by mole of the titanium oxide in the slurry to deflocculate the particles of titanium oxide. Zirconia beads having a diameter of 100 μm were added to the thus obtained slurry in the same volume as that of the slurry, and wet dispersion treatment was performed for 4 hours using a planetary ball mill, thereby an aqueous dispersion of particles of rutile titanium oxide was obtained.

Sixth Step

The aqueous dispersion of particles of rutile titanium oxide obtained was subjected to dialysis in order to remove excess nitric acid and water-soluble salts dissolved therein until the aqueous dispersion had an electric conductivity of 3.2 mS/cm, thereby an aqueous dispersion of particles of rutile titanium oxide was obtained.

The thus obtained dispersion was heated at 105° C. for 12 hours to remove water, thereby particles of rutile titanium oxide were obtained as powder. As an X-ray diffraction diagram of the thus obtained powder of rutile titanium oxide is shown in FIG. 1, the titanium oxide was found to be composed of single phase of rutile titanium oxide.

Figure 2:
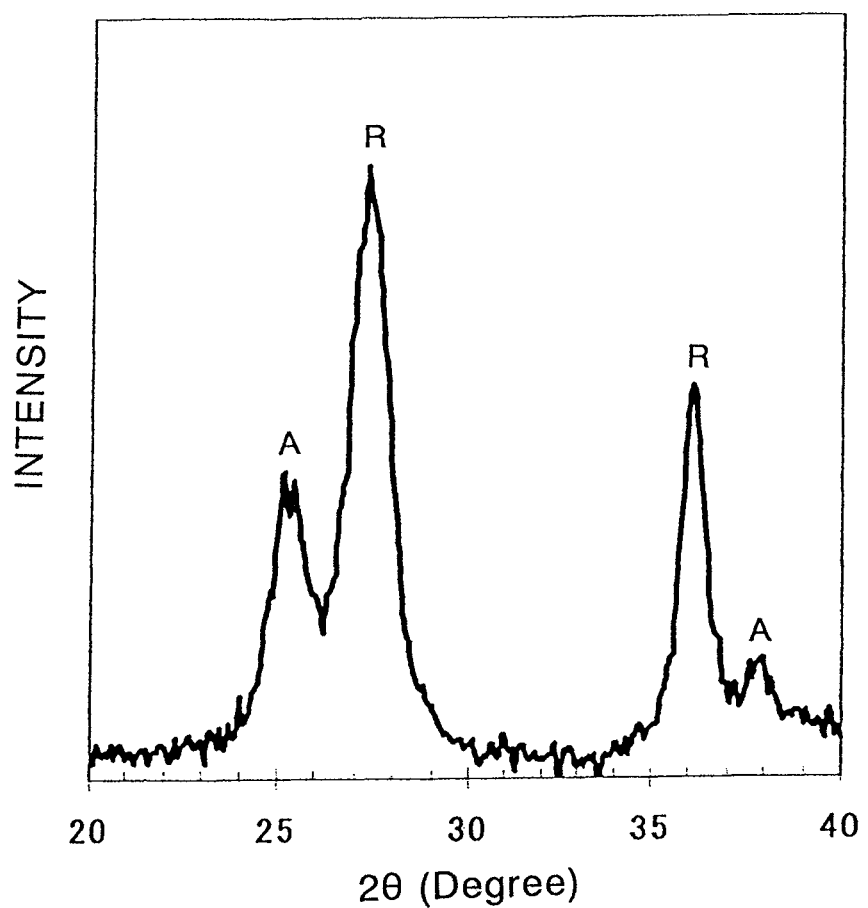
FIG. 2 shows a powder X-ray diffraction pattern of particles of titanium oxide obtained from a dispersion obtained when titanium tetrachloride was hydrolyzed at a temperature of 80° C.
Figure 3:
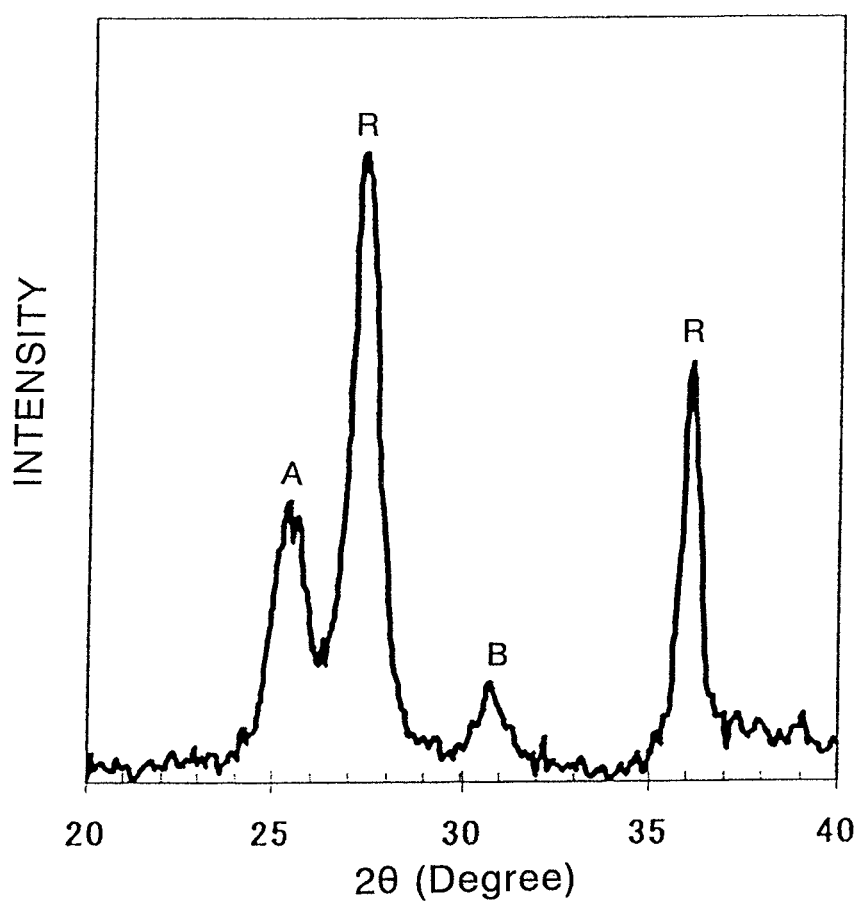
FIG. 3 shows a powder X-ray diffraction pattern of particles of titanium oxide obtained from another dispersion obtained when titanium tetrachloride was hydrolyzed at a temperature of 80° C.

In FIG. 1, FIG. 2 and FIG. 3, A, R, and B denote anatase, rutile, and brookite titanium oxide, respectively.

Example 2

In the first step of Example 1, an aqueous solution of titanium tetrachloride was heated at a temperature of 50° C. and hydrolyzed, and otherwise in the same manner as in Example 1, an aqueous dispersion of particles of rutile titanium oxide was obtained.

Example 3

In the first step of Example 1, an aqueous solution of titanium tetrachloride having a chloride ion concentration of 3.0 mole/L and a titanium ion concentration of 64.7 g/L in terms of titanium oxide was used and hydrolyzed, and otherwise in the same manner as in Example 1, an aqueous dispersion of particles of rutile titanium oxide was obtained.

Example 4

In the first step of Example 3, an aqueous solution of titanium tetrachloride was heated at a temperature of 50° C. and hydrolyzed, and otherwise in the same manner as in Example 3, an aqueous dispersion of particles of rutile titanium oxide was obtained.

Example 5

In the first step of Example 1, an aqueous solution of titanium tetrachloride having a chloride ion concentration of 4.3 mole/L and a titanium ion concentration of 95.8 g/L in terms of titanium oxide was used and hydrolyzed, and otherwise in the same manner as in Example 1, an aqueous dispersion of particles of rutile titanium oxide was obtained.

Example 6

In the first step of Example 1, an aqueous solution of titanium tetrachloride having a chloride ion concentration of 1.0 mole/L and a titanium ion concentration of 15.9 g/L in terms of titanium oxide was used and hydrolyzed, and otherwise in the same manner as in Example 1, an aqueous dispersion of particles of rutile titanium oxide was obtained.

Example 7

In the first step of Example 6, an aqueous solution of titanium tetrachloride was heated at a temperature of 30° C. and hydrolyzed, and otherwise in the same manner as in Example 6, an aqueous dispersion of particles of rutile titanium oxide was obtained.

Comparative Example 1

In the first step of Example 1, an aqueous solution of titanium tetrachloride having a chloride ion concentration of 2.3 mole/L and a titanium ion concentration of 50.7 g/L in terms of titanium oxide was used and hydrolyzed at a temperature of 80° C., and otherwise in the same manner as in Example 1, an aqueous dispersion of particles of rutile titanium oxide was obtained.

The thus obtained aqueous dispersion was heated at 105° C. for 12 hours to remove water, thereby particles of rutile titanium oxide were obtained as powder. As an X-ray diffraction diagram of the thus obtained powder of rutile titanium oxide is shown in FIG. 2, the titanium oxide was found to be composed of rutile and anatase titanium oxide.

Comparative Example 2

In the first step of Example 1, an aqueous solution of titanium tetrachloride having a chloride ion concentration of 4.1 mole/L and a titanium ion concentration of 86.3 g/L in terms of titanium oxide was used and hydrolyzed at a temperature of 80° C., and otherwise in the same manner as in Example 1, an aqueous dispersion of particles of rutile titanium oxide was obtained.

The thus obtained aqueous dispersion was heated at 105° C. for 12 hours to remove water, thereby particles of rutile titanium oxide were obtained as powder. As an X-ray diffraction diagram of the thus obtained powder of rutile titanium oxide is shown in FIG. 3, the titanium oxide was found to be composed of rutile, anatase, and brookite titanium oxide.

Table 1 shows the reaction conditions in the hydrolysis of aqueous solutions of titanium tetrachloride in Examples 1-7 and Comparative Example 1 and 2, the particle size distributions (D50 and D90) of the particles of titanium oxide in the aqueous dispersions obtained in Examples 1-7 and Comparative Example 1 and 2, and the properties of the particles of titanium oxide (crystal structures based on powder X-ray diffraction, rates of weight loss on heating and specific surface areas).

Second Step

The slurry was filtered through a filter paper made of glass fiber having a collection diameter of 300 nm, and unreacted titanium tetrachloride and dissolved components were removed. The thus obtained particles of rutile titanium oxide were repulped in water to prepare a slurry, and an aqueous solution of sodium hydroxide was added to the slurry until it had a pH of 7.0. The resulting slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 50 g/L in terms of titanium oxide, the resulting slurry had an electric conductivity of 100 µS/cm or less.

Pre-Third Step

The particles of rutile titanium oxide obtained in the second step were repulped in water so that the resulting slurry

TABLE 1

| | Reaction Conditions in Hydrolysis in the First Step | | Properties of Particles of Titanium Oxide | | | Particle Size Distribution of Aqueous Dispersion | |
|---|---|---|---|---|---|---|---|
| | Chloride Ion Concentration (mole/L) | Reaction Temperature (° C.) | Crystal Structure of Titanium Oxide | Rate of Weight Loss (%) | Specific Surface Area (m²/g) | D50 (nm) | D90 (nm) |
| Example 1 | 2.3 | 70 | Single phase of rutile | 4 | 128 | 9 | 16 |
| Example 2 | 2.3 | 50 | Single phase of rutile | 4 | 127 | 12 | 20 |
| Example 3 | 3.0 | 70 | Single phase of rutile | 4 | 125 | 9 | 11 |
| Example 4 | 3.0 | 50 | Single phase of rutile | 4 | 132 | 9 | 15 |
| Example 5 | 4.3 | 70 | Single phase of rutile | 4 | 123 | 10 | 13 |
| Example 6 | 1.0 | 70 | Single phase of rutile | 4 | 128 | 14 | 24 |
| Example 7 | 1.0 | 30 | Single phase of rutile | 4 | 122 | 12 | 21 |
| Comparative 1 | 2.3 | 80 | (a) | 4 | 124 | 13 | 19 |
| Comparative 2 | 4.1 | 80 | (a) | 4 | 126 | 12 | 17 |

Notes:
(a) Other phases found in addition to rutile

As apparent from the results shown in Table 1, the aqueous dispersions of particles of rutile titanium oxide obtained in accordance with the invention have a D50 within a range of 1 to 15 nm, preferably 3 to 15 nm, and a D90 of 40 nm or less, preferably 25 nm or less in particle size distribution. The particles of rutile titanium oxide obtained from the aqueous dispersions have a specific surface area of 120 m²/g or more, and a rate of weight loss of 5% or less when they are heated from 105° C. to 900° C.

The aqueous dispersions of particles of rutile titanium oxide obtained in accordance with the invention have particles of rutile titanium oxide of high crystallinity as a dispersed phase, and are excellent in stability.

Example 8

First Step

An amount of 3 L of an aqueous solution of titanium tetrachloride having a chloride ion concentration of 2.3 mole/L and a titanium ion concentration of 50.7 g/L in terms of titanium oxide was placed in a separable flask equipped with a reflux apparatus, and it was heated at a temperature of 70° C. for 3 hours so that the titanium tetrachloride was hydrolyzed, thereby a slurry containing the thus precipitated particles of rutile titanium oxide was obtained.

had a content of 100 g/L of rutile titanium oxide in terms of titanium oxide. Acetic acid was added to the slurry in an amount of 150 parts by mole per 100 parts by mole of the titanium oxide in the slurry. The resulting slurry was subjected to wet grinding treatment for 3 hours using a recirculation bead mill, Ultra Apex Mill UAM-05 available from Kotobuki Industries Co., Ltd. wherein zirconia beads having a diameter of 30 µm were used and a rotation rate of 3500 rpm was employed.

Third Step

The slurry of particles of rutile titanium oxide obtained in the pre-third step was diluted with water so that it had a titanium oxide content of 50 g/L, and was subjected to a hydrothermal reaction at a temperature of 150° C. for 3 hours to increase the crystallinity of particles of rutile titanium oxide in the presence of acetic acid that had been added to the slurry in the pre-third step.

Fourth Step

An aqueous solution of sodium hydroxide was added to the slurry obtained by the hydrothermal reaction described above until the slurry had a pH of 5.0. The slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 100 g/L in terms of titanium oxide, the resulting slurry had an electric conductivity of 100 μS/cm or less.

Fifth Step

The particles of rutile titanium oxide obtained in the fourth step were repulped in water so that the resulting slurry had a content of 100 g/L of rutile titanium oxide in terms of titanium oxide. Nitric acid was then added to the slurry in an amount of 60 parts by mole per 100 parts by mole of the titanium oxide in the slurry to deflocculate the particles of titanium oxide. The thus obtained slurry was subjected to wet dispersion treatment for 10 hours using a recirculation bead mill, Ultra Apex Mill UAM-05 available from Kotobuki Industries Co., Ltd. wherein zirconia beads having a diameter of 30 μm were used and a rotation rate of 2350 rpm was employed.

Sixth Step

The aqueous dispersion of particles of rutile titanium oxide obtained was washed by using a ultrafilter in order to remove excess nitric acid and water-soluble salts dissolved therein until the aqueous dispersion had an electric conductivity of 3.2 mS/cm. Thereafter, the resulting dispersion was concentrated to provide an aqueous dispersion of particles of rutile titanium oxide having a rutile titanium oxide content of 15% by weight.

The thus obtained aqueous dispersion was heated at 105° C. for 12 hours to remove water, thereby particles of rutile titanium oxide were obtained as powder. It was confirmed based on X-ray diffraction that the particles of titanium oxide was composed of single phase rutile titanium oxide.

Example 9

In the first step of Example 8, an aqueous solution of titanium tetrachloride was hydrolyzed at a temperature of 50° C., and otherwise in the same manner as in Example 8, an aqueous dispersion of particles of rutile titanium oxide was obtained.

Example 10

In the first step of Example 8, an amount of 7 L of an aqueous solution of titanium tetrachloride having a chloride ion concentration of 1.0 mole/L and a titanium ion concentration of 15.9 g/L in terms of titanium oxide was used and hydrolyzed, and otherwise in the same manner as in Example 8, an aqueous dispersion of particles of rutile titanium oxide was obtained.

Example 11

First Step

An amount of 3 L of an aqueous solution of titanium tetrachloride having a chloride ion concentration of 2.3 mole/L and a titanium ion concentration of 50.7 g/L in terms of titanium oxide was placed in a separable flask equipped with a reflux apparatus, and it was heated at a temperature of 70° C. for 3 hours so that the titanium tetrachloride was hydrolyzed, thereby a slurry containing the thus precipitated particles of rutile titanium oxide was obtained.

Second Step

The slurry was filtered through a filter paper made of glass fiber having a collection diameter of 300 nm, and unreacted titanium tetrachloride and dissolved components were removed. The thus obtained particles of rutile titanium oxide were repulped in water to prepare a slurry, and an aqueous solution of sodium hydroxide was added to the slurry until it had a pH of 7.0. The resulting slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 50 g/L in terms of titanium oxide, the resulting slurry had an electric conductivity of 100 μS/cm or less.

Third Step

The particles of rutile titanium oxide obtained in the second step was repulped in water so that the resulting slurry had a content of 50 g/L of rutile titanium oxide in terms of titanium oxide. Acetic acid was added to the slurry in an amount of 150 parts by mole per 100 parts by mole of the titanium oxide in the slurry. The mixture was then subjected to a hydrothermal reaction at 150° C. for 3 hours to increase the crystallinity of particles of rutile titanium oxide.

Fourth Step

An aqueous solution of sodium hydroxide was added to the slurry obtained by the hydrothermal reaction described above until the slurry had a pH of 5.0. The slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 100 g/L in terms of titanium oxide, the resulting slurry had an electric conductivity of 100 μS/cm or less.

Fifth Step

The particles of rutile titanium oxide obtained in the fourth step were repulped in water so that the resulting slurry had a content of 100 g/L of rutile titanium oxide in terms of titanium oxide. Nitric acid was then added to the slurry in an amount of 60 parts by mole per 100 parts by mole of the titanium oxide in the slurry to deflocculate the titanium oxide. The thus obtained slurry was subjected to wet dispersion treatment using a recirculation bead mill, Ultra Apex Mill UAM-05 available from Kotobuki Industries Co., Ltd. wherein zirconia beads having a diameter of 30 μm were used and wherein a rotation rate of 3500 rpm was employed for the first 3 hours, and then a rotation rate of 2350 rpm for the subsequent 10 hours, thereby an aqueous dispersion of particles of rutile titanium oxide was obtained.

Sixth Step

The aqueous dispersion of particles of rutile titanium oxide obtained was washed by using a ultrafilter in order to remove excess nitric acid and water-soluble salts dissolved therein until the aqueous dispersion had an electric conductivity of 3.2 mS/cm. Thereafter, the resulting dispersion was concentrated to provide an aqueous dispersion of particles of rutile titanium oxide having a rutile titanium oxide content of 15% by weight.

The thus obtained aqueous dispersion of particles of rutile titanium oxide was heated at 105° C. for 12 hours to remove water, thereby particles of rutile titanium oxide were obtained as powder. It was confirmed based on X-ray diffraction that the particles of titanium oxide was composed of single phase rutile titanium oxide.

Example 12

In the first step of Example 11, an aqueous solution of titanium tetrachloride was hydrolyzed at a temperature of 50° C., and otherwise in the same manner as in Example 11, an aqueous dispersion of particles of rutile titanium oxide was obtained.

Example 13

In the first step of Example 11, an amount of 7 L of an aqueous solution of titanium tetrachloride having a chloride ion concentration of 1.0 mole/L and a titanium ion concentration of 15.9 g/L in terms of titanium oxide was used and hydrolyzed, and otherwise in the same manner as in Example 11, an aqueous dispersion of particles of rutile titanium oxide was obtained.

Example 14

First Step

An amount of 3 L of an aqueous solution of titanium tetrachloride having a chloride ion concentration of 2.3 mole/L and a titanium ion concentration of 50.7 g/L in terms of titanium oxide was placed in a separable flask equipped with a reflux apparatus, and it was heated at a temperature of 70° C. for 3 hours so that the titanium tetrachloride was hydrolyzed, thereby a slurry containing the thus precipitated particles of rutile titanium oxide was obtained.

Second Step

The slurry was filtered through a filter paper made of glass fiber having a collection diameter of 300 nm, and unreacted titanium tetrachloride and dissolved components were removed. The thus obtained particles of rutile titanium oxide were repulped in water to prepare a slurry, and an aqueous solution of sodium hydroxide was added to the slurry until it had a pH of 7.0. The resulting slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 50 g/L in terms of titanium oxide, the resulting slurry had an electric conductivity of 100 μS/cm or less.

Third Step

The particles of rutile titanium oxide obtained in the second step was repulped in water so that the resulting slurry had a content of 50 g/L of rutile titanium oxide in terms of titanium oxide. Acetic acid was added to the slurry in an amount of 150 parts by mole per 100 parts by mole of the titanium oxide in the slurry. The mixture was subjected to a hydrothermal reaction at 150° C. for 3 hours to increase the crystallinity of particles of rutile titanium oxide.

Fourth Step

An aqueous solution of sodium hydroxide was added to the slurry obtained by the hydrothermal reaction described above until the slurry had a pH of 5.0. The slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 100 g/L in terms of titanium oxide, the resulting slurry had an electric conductivity of 100 μS/cm or less.

Fifth Step

The particles of rutile titanium oxide obtained in the fourth step were repulped in water so that the resulting slurry had a content of 100 g/L of rutile titanium oxide in terms of titanium oxide. Nitric acid was then added to the slurry in an amount of 60 parts by mole per 100 parts by mole of the titanium oxide in the slurry to deflocculate the titanium oxide. The thus obtained slurry was subjected to wet dispersion treatment for 10 hours using a recirculation bead mill, Ultra Apex Mill UAM-05 available from Kotobuki Industries Co., Ltd. whereupon zirconia beads having a diameter of 30 μm were used and a rotation rate of 2350 was employed.

Sixth Step

The aqueous dispersion of particles of rutile titanium oxide obtained was washed by using a ultrafilter in order to remove excess nitric acid and water-soluble salts dissolved therein until the aqueous dispersion had an electric conductivity of 3.2 mS/cm. Thereafter, the resulting dispersion was concentrated to provide an aqueous dispersion of particles of rutile titanium oxide having a rutile titanium oxide content of 15% by weight.

The thus obtained dispersion was heated at 105° C. for 12 hours to remove water, thereby particles of rutile titanium oxide were obtained as powder. It was confirmed based on X-ray diffraction that the particles of titanium oxide were composed of single phase rutile titanium oxide.

Table 2 shows the reaction conditions in the hydrolysis of aqueous solutions of titanium tetrachloride in Examples 8-14, the dispersing stability of the aqueous dispersions obtained in Examples 8-14, the particle size distribution (D50, D90 and D100) of the particles of titanium oxide in the aqueous dispersions obtained in Examples 8-14, and the properties of the particles of titanium oxide (rates of weight loss on heating and specific surface areas).

TABLE 2

| | Reaction Conditions in Hydrolysis in the First Step | | Properties of Aqueous Dispersion | | | | Properties of Particles Obtained from Dispersion | |
|---|---|---|---|---|---|---|---|---|
| | Chloride Ion Concentration (mole/L) | Reaction Temperature (° C.) | D50 (nm) | D90 (nm) | D100 (nm) | Dispersion Stability | Rate of Weight Loss (%) | Specific Surface Area (m²/g) |
| Example 8 | 2.3 | 70 | 3 | 8 | 25 | Good | 4 | 220 |
| Example 9 | 2.3 | 50 | 5 | 11 | 30 | Good | 4 | 198 |
| Example 10 | 1.0 | 70 | 3 | 10 | 25 | Good | 4 | 216 |
| Example 11 | 2.3 | 70 | 5 | 14 | 36 | Good | 4 | 169 |
| Example 12 | 2.3 | 50 | 7 | 13 | 30 | Good | 4 | 174 |
| Example 13 | 1.0 | 70 | 8 | 14 | 36 | Good | 4 | 157 |
| Example 14 | 2.3 | 70 | 8 | 17 | 43 | Good | 4 | 139 |

As clear from the results shown in Table 2, when the slurry of particles of rutile titanium oxide obtained in the second step is subjected to wet grinding treatment in the presence of an organic acid in the pre-third step before the slurry is subjected to hydrothermal reaction, an aqueous dispersion of much finer particles of rutile titanium oxide can be obtained.

Also, in the fifth step, when an acid is added to the slurry of titanium oxide to deflocculate the slurry, and then the resulting slurry is subjected to wet grinding treatment, followed by wet dispersion treatment, an aqueous dispersion of much finer particles of rutile titanium oxide can be obtained.

Namely, according to the invention, when the slurry of particles of titanium oxide is subjected to wet grinding treatment in the pre-third step or the fifth step, the particles of titanium oxide in the resulting aqueous dispersion have a particle size distribution in which the D50 is in a range of 1-10 nm, and the D100 is in a range of 40 nm or less. The particles obtained by drying the resulting dispersion thus obtained have a specific surface area of 150 g/m² or more, and in preferable cases, a specific surface area of 180 g/m² or more.

Further, as determined as a difference in weight when the particles are heated from 105° C. to 900° C., the rate of weight loss of the fine particles of rutile titanium oxide obtained in such a manner as described above is 5%, or less. Therefore, the aqueous dispersions of particles of rutile titanium oxide obtained in accordance with the invention have particles of rutile titanium oxide of high crystallinity as a dispersed phase, and are excellent in stability.

Example 15

The aqueous dispersion of particles of rutile titanium oxide obtained in Example 1 was subjected to solvent displacement by ultrafiltration to obtain a dispersion of particles of rutile titanium oxide whose dispersion medium was methanol and whose content of rutile titanium oxide was 20% by weight.

4.4 parts by weight of 0.01 N hydrochloric acid was added to 12.5 parts by weight of 3-glycidoxypropyltrimethoxysilane (KBM-403 manufactured by Shin-Etsu Chemical Co., Ltd.) and the resulting mixture was stirred for 24 hours.

62.5 parts by weight of the above-mentioned dispersion of particles of rutile titanium oxide having a solid content of 20% by weight, 15 parts by weight of propylene glycol monomethyl ether, 56 parts by weight of methanol, and a small amount of hardening agent (aluminum acetylacetonate) were added to the mixture, and stirred, thereby a coating agent for hard coating was obtained.

The coating agent was spin-coated on a slide glass plate at a rate of 500 rpm for 3 seconds, dried at 25° C. for 30 minutes, at 80° C. for 15 minutes, and then at 150° C. for 60 minutes, thereby to form a coated film 2 μm thick. The total light transmittance and the haze value of the coated film were found to be 85% and 0.3, respectively.

Example 16

Preparation of Resin Composition Comprising Particles of Rutile Titanium Oxide and Evaluation Thereof The aqueous dispersion of particles of rutile titanium oxide obtained in Example 8 was subjected to solvent displacement by ultrafiltration to obtain a dispersion of particles of rutile titanium oxide whose dispersion medium was methanol and whose content of rutile titanium oxide was 20% by weight.

Using the dispersion of particles of rutile titanium oxide obtained above, a coating agent for hard coating was prepared in the same manner as in Example 15. In the same manner as in Example 15, the coating agent was spin-coated on a slide glass, and dried, thereby to form a coated film 2 μm thick. The total light transmittance and the haze value of the coated film were found to be 90% and 0.1, respectively.

The invention claimed is:

1. A process for producing an aqueous dispersion of particles of rutile titanium oxide, which comprises:
    a first step in which after a chloride ion concentration of an aqueous solution of titanium tetrachloride is adjusted to 0.5 mole/L or more, and less than 4.4 mole/L, the aqueous solution of titanium tetrachloride is heated at a temperature in a range of from 25° C. to 75° C. to hydrolyze the titanium tetrachloride, thereby obtaining a slurry containing the thus precipitated particles of rutile titanium oxide;
    a second step in which the slurry obtained in the first step is filtered and washed with water to remove water-soluble salts dissolved therein from the slurry;
    a third step in which the slurry obtained in the second step is subjected to a hydrothermal reaction in the presence of an organic acid;
    a fourth step in which the slurry obtained in the third step is filtered and washed with water to remove water-soluble salts dissolved therein from the slurry;
    a fifth step in which an acid is added to the slurry obtained in the fourth step to deflocculate the slurry, and the resulting slurry is subjected to wet dispersion treatment, thereby obtaining a dispersion;
    a sixth step in which excess acid and water-soluble salts are removed from the dispersion obtained in the fifth step.

2. The process for producing an aqueous dispersion of particles of rutile titanium oxide according to claim 1, which further comprises a pre-third step between the second step and the third step, wherein in the pre-third step the slurry obtained in the second step is subjected to wet grinding treatment in the presence of an organic acid.

3. The process for producing an aqueous dispersion of particles of rutile titanium oxide according to claim 1, wherein in the fifth step, after an acid is added to the slurry obtained in the fourth step to deflocculate the slurry, the slurry is subjected to wet grinding treatment, and is then subjected to wet dispersion treatment.

4. The process for producing an aqueous dispersion of particles of rutile titanium oxide according to claim 1, wherein in the third step the slurry is subjected to a hydrothermal reaction in the presence of an organic acid in an amount of 75 parts by mole or more per 100 parts by mole titanium oxide in the slurry.

5. The process for producing an aqueous dispersion of rutile titanium oxide according to claim 1, wherein in the sixth step excess acid in the dispersion obtained in the fifth step is removed therefrom so that the slurry has an electric conductivity of 1-5 mS/cm.

6. The process for producing an aqueous dispersion of particles of rutile titanium oxide according to claim 1, wherein in the third step the hydrothermal reaction is performed at a temperature in a range of from 120° C. to 180° C.

7. A process for producing a dispersion of particles of rutile titanium oxide which comprises:
   a first step in which after a chloride ion concentration of an aqueous solution of titanium tetrachloride is adjusted to 0.5 mole/L or more, and less than 4.4 mole/L, the aqueous solution of titanium tetrachloride is heated at a temperature in a range of from 25° C. to 75° C. to hydrolyze the titanium tetrachloride, thereby obtaining a slurry containing the thus precipitated particles of rutile titanium oxide;
   a second step in which the slurry obtained in the first step is filtered and washed with water to remove water-soluble salts dissolved therein from the slurry;
   a third step in which the slurry obtained in the second step is subjected to a hydrothermal reaction in the presence of an organic acid;
   a fourth step in which the slurry obtained in the third step is filtered and washed with water to remove water-soluble salts dissolved therein from the slurry;
   a fifth step in which an acid is added to the slurry obtained in the fourth step to deflocculate the slurry, and the resulting slurry is subjected to wet dispersion treatment, thereby obtaining a dispersion;
   a sixth step in which excess acid and water-soluble salts are removed from the dispersion obtained in the fifth step; and
   a seventh step in which water that is the dispersion medium of the slurry obtained in the sixth step is replaced by an organic solvent.

8. The process for producing a dispersion of particles of rutile titanium oxide according to claim 7, which further comprises a pre-third step between the second step and the third step, wherein in the pre-third step the slurry obtained in the second step is subjected to wet grinding treatment in the presence of an organic acid.

9. The process for producing a dispersion of particles of rutile titanium oxide according to claim 7, wherein in the fifth step, after an acid is added to the slurry obtained in the fourth step to deflocculate the slurry, the slurry is subjected to wet grinding treatment, and is then subjected to wet dispersion treatment.

* * * * *